US006452598B1

United States Patent
Rafey et al.

(10) Patent No.: US 6,452,598 B1
(45) Date of Patent: Sep. 17, 2002

(54) SYSTEM AND METHOD FOR AUTHORING AND TESTING THREE-DIMENSIONAL (3-D) CONTENT BASED ON BROADCAST TRIGGERS USING A STANDARD VRML AUTHORING TOOL

(75) Inventors: Richter A. Rafey, Santa Clara; Sidney Wang, Pleasanton, both of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/484,579

(22) Filed: Jan. 18, 2000

(51) Int. Cl.$^7$ .............................................. G06T 15/00

(52) U.S. Cl. ...................................................... 345/473

(58) Field of Search ................................. 345/419, 423, 345/428, 473, 474, 475

(56) References Cited

U.S. PATENT DOCUMENTS 6,204,862 B1 * 3/2001 Barstow et al. ............. 345/473
6,300,660 B1 * 10/2001 DeRose ....................... 345/473
6,346,944 B1 * 2/2002 Suzuli et al. ................ 345/473

\* cited by examiner

*Primary Examiner*—Phu K. Nguyen
(74) *Attorney, Agent, or Firm*—Wagner Murabito & Hao LLP (57) ABSTRACT

A system and method for authoring and testing three-dimensional (3-D) content based on broadcast triggers using a standard VRML authoring tool. In one embodiment, a computer implemented method for authoring and testing three-dimensional (3-D) content based on broadcast triggers using a standard authoring tool of a 3-D graphics platform is provided. In this embodiment, the method comprises the step of defining a timelist comprising video triggers, wherein each of the video triggers represents a time at which an event is to occur within a 3-D graphics scene generated using the 3-D graphics platform, and wherein the timelist is stored in a data file that is an input format supported by the 3-D graphics platform. The method also comprises the step of periodically generating a simulation tick representing a simulated video frame from a simulated media stream. The method further comprises the step of generating time data for the simulation tick, wherein the time data is associated with the simulated video frame. The method also comprises the step of comparing the video triggers and the time data. The method further comprises the step of effectuating a behavior change for an object in the 3-D graphics scene in response to a match between one of the video triggers and the time data such that the behavior change is synchronized with the simulated video frame in real-time. In one embodiment, the present invention includes the above steps and wherein the 3-D graphics platform comprises a VRML platform and the data file comprises a VRML scene description file.

24 Claims, 7 Drawing Sheets

SYSTEM AND METHOD FOR AUTHORING AND TESTING THREE-DIMENSIONAL (3-D) CONTENT BASED ON BROADCAST TRIGGERS USING A STANDARD VRML AUTHORING TOOL

BACKGROUND OF THE INVENTION

1. Field of the Invention

The present invention relates to the design of interactive graphics and video systems. More specifically, the present invention pertains to a system and method for authoring and testing 3-D content based on broadcast triggers using a standard VRML authoring tool.

2. Related Art

Traditional television broadcast has been a one-way communication channel. Until recently, virtually all available broadcast content is authored, edited and composited at the head end by content providers (who can either be the broadcasters or separate entities) such that all viewers have an identical view. Moreover, traditional televisions and other broadcast receivers typically do not have three-dimensional (3-D) graphics capability (e.g., specialized hardware and/or software) built into them. Thus, even though the notion of interactive television has been in existence for some time, due to bandwidth limitations, the lack of 3-D graphics processing support and other reasons, interactive media content with 3-D graphics is not feasible or practicable in the traditional television broadcast paradigm.

The advent of digital television (DTV) technology has enabled the development of interactive content and its delivery to the viewers'homes. Generally, digital broadcast can be characterized as a high-speed data pipe into the home, providing dramatic bandwidth improvements over traditional broadcast for content delivery. Thus, once the digital broadcast infrastructure has been deployed, new types of applications, new kinds of services and new forms of entertainment become feasible. For example, this broadcast data pipe allows numerous forms of "enhanced television" programming (e.g., TV programs with accompanying data, such as game scores and statistics in a sports program) to be delivered to viewers at home, who enjoy wide latitudes to choose when and how to view the additional information. In addition, unlike traditional televisions and other broadcast receivers, industry-standard DTV receivers can be built to support local 3-D graphics acceleration. Therefore, it is also possible to develop sophisticated applications that use the high speed broadcast data pipe to incorporate interactive 3-D graphics into digital broadcast content to greatly enrich the viewers'experience.

Since DTV technology can provide the requisite bandwidth for delivery of rich media content as well as the capability for processing 3-D graphics, next generation systems that support the integration of broadcast content and interactive 3-D graphics can be proposed, provided that a viable mechanism for interfacing the broadcast content and the graphics components is available. Thus, it would be highly advantageous to provide such an interfacing mechanism to maximize the potential benefits afforded by the latest DTV technology.

Furthermore, it is appreciated that compatibility is essential in developing an interfacing mechanism. More specifically, numerous vendors will offer different appliances and applications for use in a DTV environment. As such, it would be desirable that these different appliances and applications can share a common interfacing mechanism such that they can work together seamlessly.

Additionally, it is appreciated that typical multimedia authoring tools are designed to operate within a self-contained environment and generally have a built-in runtime to verify the authored content. As such, these tools do not provide direct support for external, non-native interfacing mechanism. For example, lack of support for external broadcast triggering mechanism is prevalent in authoring tools for 3-D graphics platforms because such tools have traditionally not been considered applicable or useful in the context of television broadcasting. Thus, in an environment where broadcast content and interactive 3-D graphics are integrated, it would be desirable to provide a mechanism for authoring 3-D content in the context of broadcast triggering such that standard multimedia authoring tools can be used.

It is further realized that one particular type of interactive content that garners much interest is interactive music videos. Indeed, music videos have been a major element of the popular music industry since "MTV" came into existence in the early 1980s. More recently, as the "convergence" of television viewing and home computing accelerates, the notion of interactive music videos is being enthusiastically explored. Therefore, once a viable mechanism for interfacing broadcast content and 3-D graphics components becomes available, it would be highly desirable to provide a method and system to deliver music videos as interactive content to viewers using DTV technology.

SUMMARY OF THE INVENTION

It would be advantageous to provide a mechanism for interfacing 3-D graphics content with broadcast video so as to deliver interactive media content. Furthermore, it would also be advantageous for such interface to utilize an existing standard which has been adopted in the industry in its implementation such that the interface is widely compatible with other applications. Additionally, it would be highly desirable to utilize such an interface to provide interactive music video capability.

Accordingly, the present invention provides a system and method for interfacing 3-D graphics content with broadcast video to generate interactive media content wherein the broadcaster and the viewer can share control of the media content. By so doing, embodiments of the present invention provide greatly enhanced viewer experience over existing broadcast video programming. Moreover, embodiments of the present invention can be efficiently implemented within a standard 3-D graphics environment that supports interactivity. As such, the present invention leverages upon a versatile technology platform for 3-D graphics and delivers a system and method that is widely compatible with other applications. Furthermore, the present invention provides a mechanism for authoring 3-D content in the context of broadcast triggering such that standard multimedia authoring tools can be used. Moreover, embodiments of the present invention can be utilized to provide interactive music capability. These and other advantages of the present invention not specifically mentioned above will become clear within discussions of the present invention presented herein.

More specifically, in one embodiment of the present invention, a computer implemented method for authoring and testing three-dimensional (3-D) content based on broadcast triggers using a standard authoring tool of a 3-D graphics platform is provided. In this embodiment, the method comprises the step of defining a timelist comprising video triggers, wherein each of the video triggers represents a time at which an event is to occur within a 3-D graphics scene generated using the 3-D graphics platform, and wherein the timelist is stored in a data file that is an input format supported by the 3-D graphics platform. The method also comprises the step of periodically generating a simulation tick representing a simulated video frame from a simulated media stream. The method further comprises the step of generating time data for the simulation tick, wherein the time data is associated with the simulated video frame. Moreover, in this embodiment, the method comprises the step of comparing the video triggers and the time data. Additionally, the method further comprises the step of effectuating a behavior change for an object in the 3-D graphics scene in response to a match between one of the video triggers and the time data such that the behavior change is synchronized with the simulated video frame in real-time. In a specific embodiment, the present invention includes the above steps and wherein the 3-D graphics platform comprises a Virtual Reality Modeling Language (VRML) platform and the data file comprises a VRML scene description file. In one embodiment, the present invention includes the above and wherein the step of periodically generating a simulation tick is implemented using a Time-Sensor node of the VRML platform.

Embodiments of the present invention include the above steps and wherein the timelist is stored in a first script node of the VRML platform, and the first script node supports event triggering by the simulated media stream. Additionally, embodiments of the present invention include the above and wherein the step of generating time data for the simulation tick comprises the step of generating the time data for the simulation tick wherein the time data represents absolute time in a native VRML data type; and also the step of converting the time data from the native VRML data type to a timecode quadruple.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, a system and method for implementing interactive video based on three-dimensional graphics and broadcast video, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities-take the form of electrical or magnetic signals capable of being stored, transferred, combined, compared, and otherwise manipulated in a computer system. It has proven convenient at times, to principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "defining", "accessing", "receiving", "comparing", "effectuating" or the like, refer to the action and processes of a computer system (e.g., FIG. 1A), or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. These steps (e.g., process 300) are implemented as program code stored in computer readable memory units of a computer system and are executed by the processor of the computer system. Although a variety of different computer systems can be used with the present invention, an exemplary general purpose computer system 100 is shown in FIG. 1A.

Computer System Environment

Figure 1A:
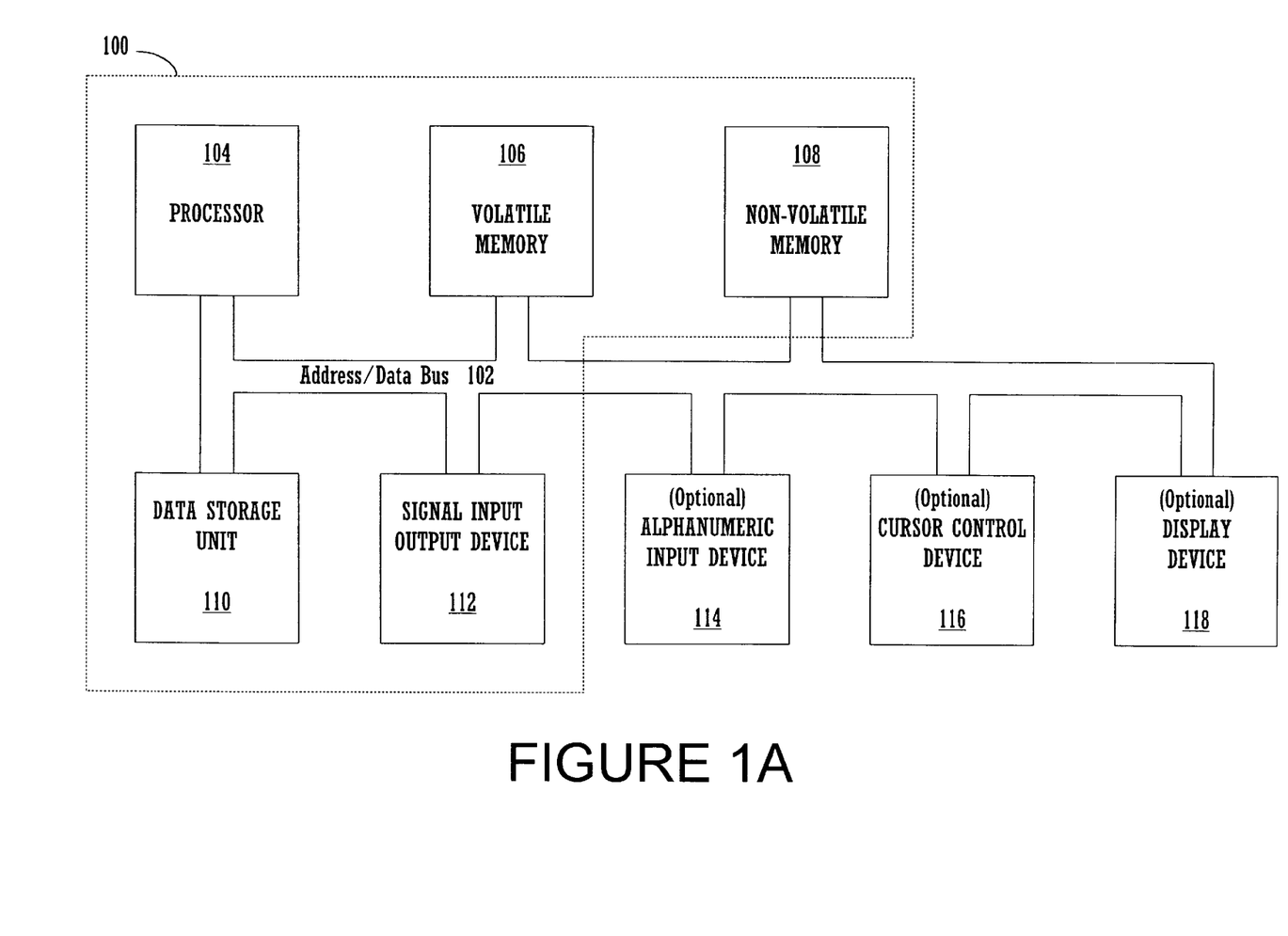
FIG. 1A is an exemplary general purpose computer system with which embodiments of the present invention can be implemented.

In general, as illustrated in FIG. 1A, computer system 100 includes an address/data bus 102 for communicating information, a central processor 104 coupled to bus 102 for processing information and instructions, a volatile memory 106 (e.g., random access memory RAM) coupled to bus 102 for storing information and instructions for central processor 104 and a non-volatile memory 108 (e.g., read only memory ROM) coupled to bus 102 for storing static information and instructions for processor 104. It is appreciated that computer system 100 of FIG. 1A is exemplary only and that the present invention can operate within a number of different computer systems including general purpose computer systems, embedded computer systems, and stand-alone computer systems specially adapted for video and/or graphics applications.

Computer system 100 also includes a data storage device 110 ("disk subsystem") such as a magnetic or optical disk and disk drive coupled with bus 102 for storing information and instructions. Data storage device 110 can include one or more removable magnetic or optical storage media (e.g., diskettes, tapes) which are computer readable memories. In accordance with the present invention, data storage device 110 can contain video and graphics data. Memory units of system 100 include 106, 108 and 110. Computer system 100 can also include a signal input output communication device 112 (e.g., modem, network interface card NIC, serial digital input) coupled to bus 102 for interfacing with other computer systems and/or data sources. In accordance with the present invention, signal input output communication device 112 can receive various incoming media streams (e.g., video signals).

Also included in computer system 100 of FIG. 1A is an optional alphanumeric input device 114 including alphanumeric and function keys coupled to bus 102 for communicating information and command selections to central processor 104. Computer system 100 also includes an optional cursor control or directing device 116 coupled to bus 102 for communicating user input information and command selections to central processor 104. An optional display device 118 can also be coupled to bus 102 for displaying information to the computer user. Display device 118 may be a liquid crystal device (LCD), other flat panel display, cathode ray tube (CRT), or other display device suitable for creating graphic images and alphanumeric characters recognizable to the user. Cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands.

It is appreciated that computer system 100 described herein illustrates an exemplary configuration of an operational platform upon which embodiments of the present invention can be implemented. Nevertheless, other computer systems with differing configurations can also be used in place of computer system 100 within the scope of the present invention.

Figure 1B:
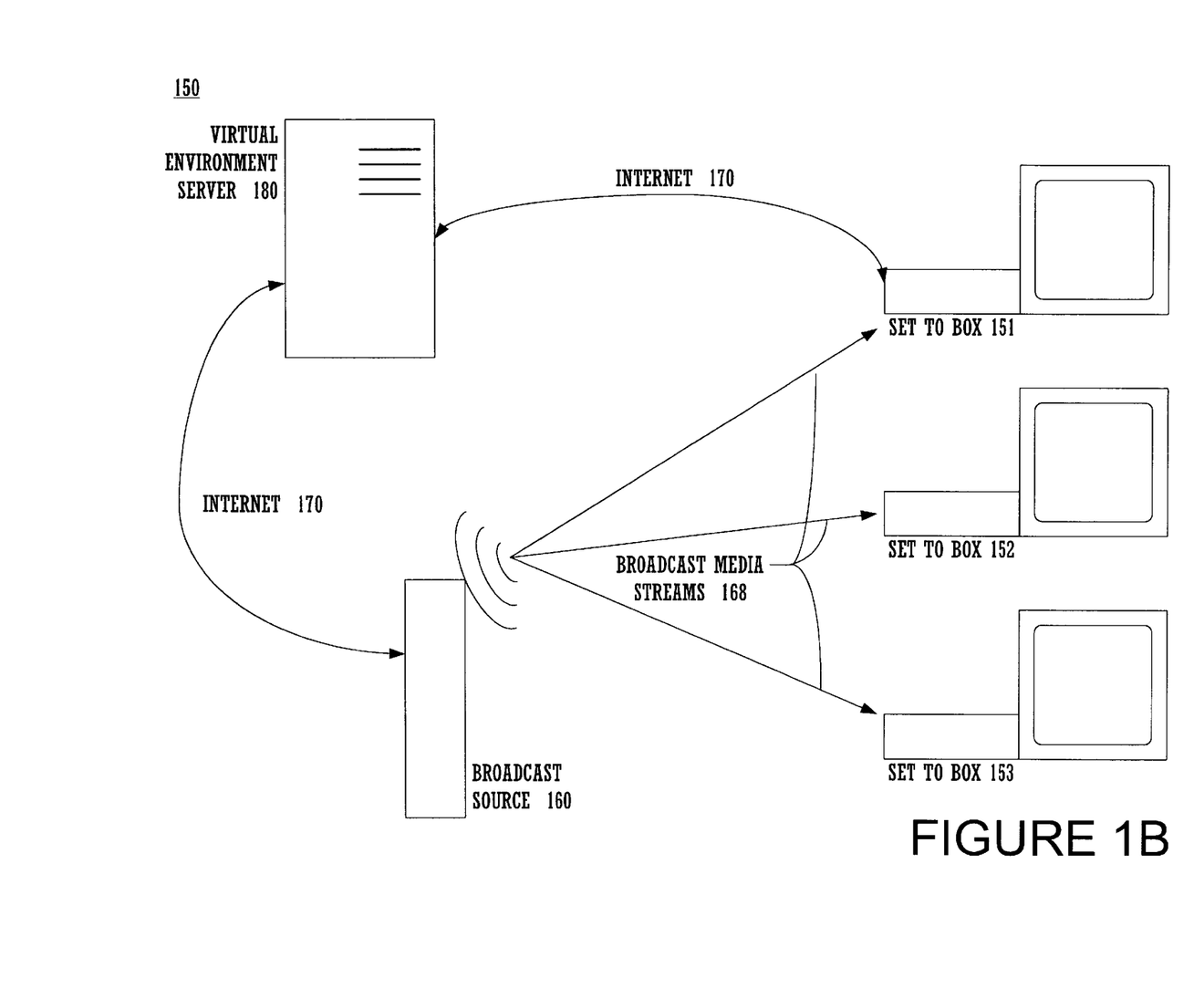
FIG. 1B is a block diagram illustrating an exemplary integrated broadcast and 3-D graphics environment in accordance with one embodiment of the present invention.

Integrated Broadcast Video and 3-D Graphics Environment in Accordance with the Present Invention Referring next to FIG. 1B, a block diagram illustrating an exemplary integrated broadcast and 3-D graphics environment 150 in accordance with one embodiment of the present invention is shown. As illustrated in FIG. 1B, within DTV environment 150, set top boxes (STBs) 151, 152 and 153 receive broadcast media streams 168 from a broadcast source 160. In one embodiment, STBs 151,152 and 153 each comprises computer system 100 of FIG. 1A. In a preferred embodiment, STBs 151,152 and 153 are DTV receivers having built-in 3-D graphics processing capability and broadcast media streams 168 can include a combination of audio streams, video streams, 3-D graphics streams and event trigger streams (e.g., tve-triggers under the ATVEF standard, described below). It is appreciated that the high bandwidth data channel provided by DTV environment 150 enables additional media elements such as 3-D graphics and interface components and event triggers to be broadcast along with traditional audio and video streams. Furthermore, it is appreciated that media local objects (e.g., graphics objects) in DTV receivers 151, 152 and 153 can leverage triggering mechanisms associated with the broadcast, thereby invoking behaviors that are synchronized with the broadcast.

Moreover, a DTV environment is also conducive to integration with the Internet 170, which can be used as an additional broadcasting source for data and media objects and as a feedback channel for bi-directional communication. As such, a complete communication loop among the viewers and the broadcaster (e.g., broadcast source 160) can be established. Thus, referring still to FIG. 1B, any of STBs 151, 152 and 153 can be coupled to a server over the Internet 170 within DTV environment 150. In an illustrative embodiment shown in FIG. 1B, STB 151 is coupled to a virtual environment server (VES) 180 over the Internet 170 (e.g., via a "back channel"). In this embodiment, VES 180 supports a "virtual world" comprising various media objects each of which has its own set of attributes. Certain of these attributes, such as the media object'[007f] position on the display, can be controlled by the viewer. Based upon viewer actions that affect the attributes of the media objects, VES 180 updates the state of this virtual world. VES 180 also communicates with broadcast source 160 (e.g., over the Internet 170) in an embodiment as shown in FIG. 1B. In one embodiment, broadcast source 160 receives feedback from the viewers (e.g., from STBs 151, 152 and 153 and through VES 180) and reacts (e.g., modifies the contents based on the feedback) accordingly, thereby allowing a high degree of personalized content distribution.

It is appreciated that in order to fully implement an integrated broadcast video and 3-D graphics environment 150 as shown in FIG. 1B for providing the functionalities as described above, several technology components are necessary. First of all, an effective technique for blending broadcast video into a 3-D virtual environment (e.g., interactive 3-D graphics scenes) is needed for seamless integration of video and 3-D graphics in environment 150. Moreover, a mechanism for event triggering via broadcast media streams is also necessary for implementing enhanced content. Additionally, a mechanism for streaming dynamic elements into content is needed to enable the injection of real-time effects into the integrated video and graphics scene. Furthermore, incorporating multi-user technology into environment 150 can facilitate broad viewer participation by allowing different viewers, celebrity characters and program hosts to interact in a shared virtual world such as environment 150.

Virtual Reality Modeling Language (VRML) Extensions in Accordance with the Present Invention In a currently preferred embodiment, the present invention provides a set of extensions to the Virtual Reality Modeling Language (VRML) to enable video from a live broadcast to appear in an animated 3-D scene associated with the video content. It is appreciated that VRML is an International Standards Organization (ISO) standard for 3-D graphics on the Internet. Furthermore, it is also appreciated that VRML is being included as the 3-D scene representation in a standard called MPEG-4 proposed by the Motion Picture Expert Group (MPEG). Indeed, VRML is being fully implemented in STBs by some vendors. As such, VRML is an ideal platform upon which 3-D graphics functionality can be integrated into next generation set-top box technologies. Thus, by extending VRML to implement broadcast video and 3-D graphics integration, the present invention leverages upon a versatile technology platform for 3-D graphics and delivers a system and method that is widely compatible with other applications.

More specifically, in one embodiment, the VRML extensions of the present invention comprise a new node definition. It is appreciated that nodes in VRML can be given arbitrary names (e.g., via the DEF construct) and that it is easy to associate value changes in different VRML nodes provided that the data types involved are compatible. An exemplary semantic definition of the new node in accordance with the present invention is shown as follows:

```
VideoTexture {
    field       SFString    source      "SDI"
    field       SFColor     chromaKey   0 0 0
    field       MFInt32     timelist    [ ]
    eventOut    MFInt32     timeEvent
}
```

In this embodiment, the source field of the VideoTexture node indicates the source from which the VRML browser of the present invention is receiving video input. Within the scope of the present invention, the value of the source field is hardware-dependent. In one embodiment, the source field can have one of two values, namely, the serial digital input (SDI) and the Ethernet port. In this embodiment, a value of SDI in the source field indicates that the video input is coming directly from an external digital video tape recorder/player (VTR). On the other hand, a value of Ethernet in the source field means that the video input is packetized and received over the Ethernet. An embodiment utilizing the Ethernet delivery mechanism is described in greater detail further below.

Moreover, the VideoTexture extension of the present invention supports both plain video and "shaped video". With reference again to the semantic definition of the VideoTexture node above, in one embodiment, the chromakey field stores chromakeying color information, which enables the handling of shaped or masked video as described below. Furthermore, the timelist field contains a list of quadruples. In one embodiment, each quadruple (h, m, s, f) represents a timestamp at which an event is expected to occur, where h stands for hour, m for minute, s for second, and f for frame. Importantly, in a preferred embodiment, the timelist field is used to facilitate event triggering in a VRML scene. The event triggering mechanism is described in greater detail below with reference to FIGS. 2 and 3. Additionally, in one embodiment, if an event does occur, the corresponding timestamp is returned via the eventOut named timeEvent.

Video Texturing and Masking in Accordance with the Present Invention

Within the scope of the present invention, video texture mapping is an effective technique for blending broadcast video into a 3-D virtual environment. It is appreciated that texture mapping in general is a well-known technique to one of ordinary skill in the art. In one embodiment of the present invention, the video texture appears as a simple, flat "video wall" in the 3-D scene. In another embodiment, the video texture is mapped onto surfaces of more complex geometry than a flat surface, in the same fashion as texture mapping is performed in a typical 3-D graphics application.

Moreover, within the scope of the present invention, the texture source can be any video device, such as a video tape recorder/player (VTR) or a digital video disk player (DVD), or a live camera feed in the case of broadcast video. In one embodiment, an SGI Octane™ graphics workstation from Silicon Graphics, Inc. of Mountain View, California, is used to implement video texture mapping. The Octane supports full-frame-rate video textures. More specifically, in this embodiment of the present invention, video streams are captured directly into texture memory. Importantly, once captured, a video field can be used as a texture as if it was an image loaded into the texture memory. Furthermore, in one embodiment, two texture buffers are used to enable double-buffering. More particularly, when a video field is being captured into one of the texture buffers, the other texture buffer can be used for drawing (e.g., rendering). Significantly, this overlapping of the video field loading process and the drawing process by using deal texture buffers enables real-time video texturing.

Additionally, in one embodiment, special effects called "shaped video" can be implemented using the VRML extensions of the present invention. More specifically, "shaped video" refers to video footage that can be made partially transparent to enable special composition effects. It is appreciated that the concept of "shaped video" is being addressed in the MPEG-4 standard. By providing the VRML extensions comprising the VideoTexture node as described above, the present invention enables "shaped video" to be efficiently implemented within a standard distributed 3-D graphics platform (e.g., VRML) that supports interactivity.

In one embodiment, the present invention explicitly transmits a mask for the video as part of the video signal in order to implement shaped video effects. In another embodiment, a chromakey in the video image (e.g., chromakey field of the VideoTexture node) is used to define a mask for generating shaped video effects. A rendering engine at the viewer's end (e.g., STBs 151, 152 and 153 of FIG. 1B) then makes the appropriate region(s) of the video transparent (e.g., visible to the viewer) as specified by the mask. With this video masking technique, the rendering operation generates arbitrarily shaped video objects irrespective of the actual shape of the target object.

Event Triggering in Accordance with the Present Invention

It is appreciated that industry-standard VRML (e.g., VRML97) has built-in mechanism for generating and responding to events. On the other hand, a consortium of broadcast and cable networks, in collaboration with consumer electronics companies, has put forth the Advanced Television Enhancement Forum (ATVEF) specification with a goal to provide a standard for enhanced television programming. It is appreciated that the ATVEF specification is not limited to digital TV or broadcast-only environments. In particular, ATVEF defines the notion of a trigger, called tve-trigger, which are real-time events sent to television receivers as part of an enhanced TV program. In response to these triggers, the receivers react and perform certain actions to augment the program content. For example, when an event trigger is received, a receiver can start a local script and/or inform the viewer that enhanced content has arrived. It is appreciated that while the functionalities that an ATVEF-compliant receiver should support are well-defined in the specification, the exact manner in which an event trigger is handled by a receiver can vary with implementations. Thus, the ATVEF specification and other efforts in this area address the definition of data channel and triggering standards and provide a robust mechanism for synchronized event delivery.

Based upon the framework (e.g., data channel, triggering standards, synchronized event delivery) defined in the ATVEF specification and the built-in capability (e.g., event generation, response to event) of VRML, the present invention provides a novel mechanism in VRML for registering external events to track in the broadcast data stream. One embodiment of the present invention implements this mechanism by abstracting broadcast trigger events in a newly defined VRML node, namely, the VideoTexture node as described above. In one embodiment, the VRML node for tracking external events is implemented as a nurryeric registry of time codes, so that only those events that are registered will cause event propagation in the VRML scene. Moreover, in this embodiment, VRML also represents connections between objects in the 3-D scene and has built-in animation mechanisms. As such, high level authoring of media events based on broadcast triggers is feasible once the interface between the broadcast channel and VRML has been defined. These aspects of the present invention are described in greater detail below with reference to FIGS. 2 and 3.

Figure 2:
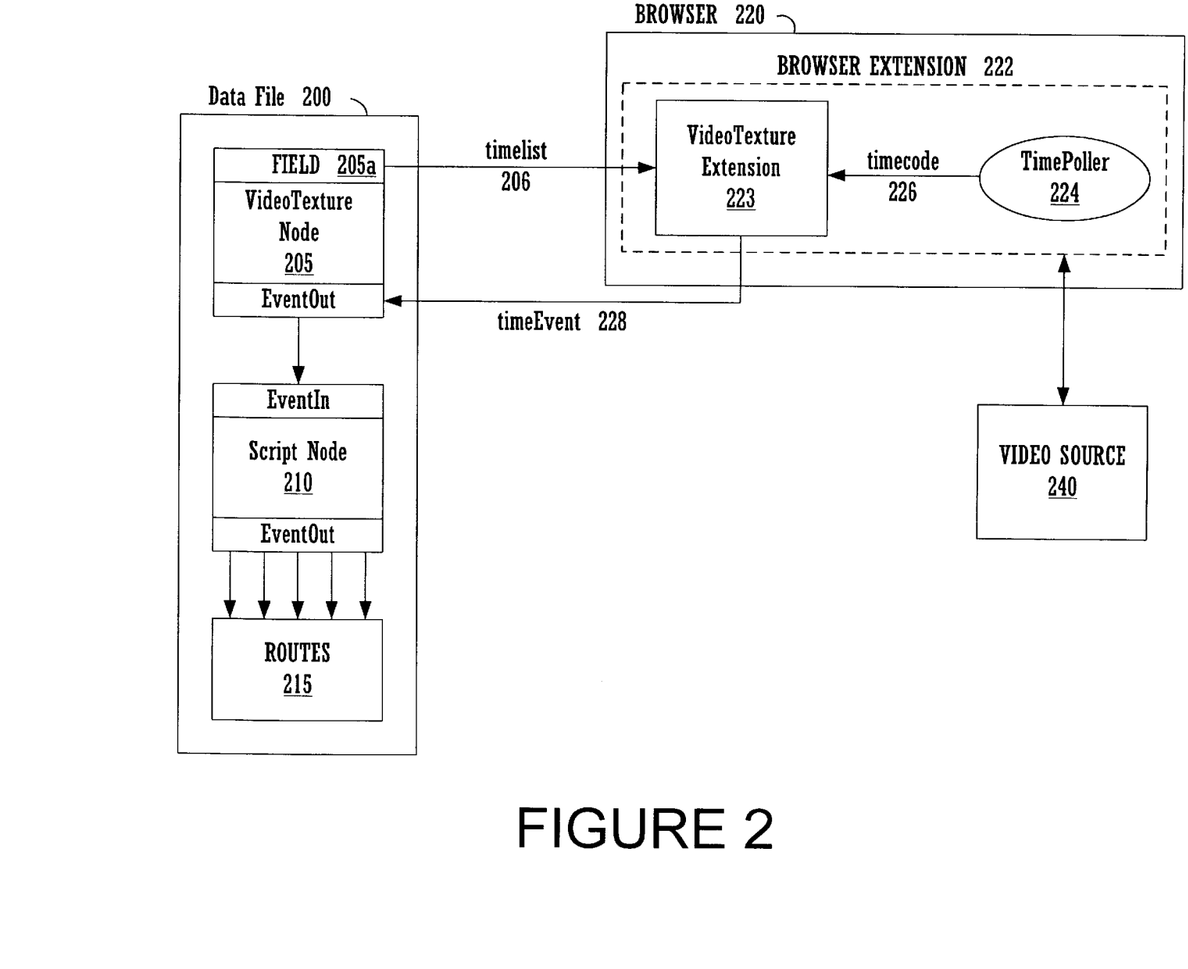
FIG. 2 is a data flow diagram illustrating data flow for performing event triggering in accordance with one embodiment of the present invention.

Referring next to FIG. 2, a data flow diagram illustrating data flow for performing event triggering in accordance with one embodiment of the present invention is shown. As depicted in FIG. 2, data is stored in a data file 200 authored by a content creator. In a currently preferred embodiment, data file 200 is a VRML scene description file having a VideoTexture node 205 of the present invention as described above, a script node 210 as well as routes 215. Script nodes and routes are elements of VRML and are known to those of ordinary skill in the art. Data in VRML scene description file 200 includes a timelist 206, which is a list of times at which triggering events are expected to occur. In one embodiment, timelist 206 is stored in the timelist field 205a of VideoTexture node 205.

Referring still to FIG. 2, a browser 220 is used to read and process data from data file 200. In a currently preferred embodiment, browser 220 is a VRML browser and includes a browser extension 222, which in turn comprises a VideoTexture extension 223 and a time poller 224. In one embodiment, time poller 224 extracts a current timecode 226 from a video source 240 via a serial port during each frame rendering cycle. In another embodiment, timecode 226 is embedded in a video signal sent to browser 220 from video source 240. Furthermore, in one embodiment, video source 240 comprises video signals from a VTR. In another embodiment, video source 240 comprises a live video feed (e.g., broadcast video signals).

Within the scope of the present invention, VideoTexture extension 223 receives timelist 206 from VideoTexture node 205 and timecode 226 from time poller 224. VideoTexture extension 223 then compares the data in timelist 206 against the current timecode 226. When a match between an item (e.g., a timestamp) in timelist 206 and current timecode 226 is detected, corresponding time event 228 of VideoTexture node 205 is sent to script node 210 for further processing. In one embodiment, script node 210 serves to launch one or more routes (e.g., routes 215) within the VRML scene when time event 228 is received from VideoTexture extension 223. Routes 215 in turn trigger behavior changes of VRML objects in the scene. Moreover, it is appreciated that the content author is responsible for ensuring that there exists a one-to-one correspondence between the times listed in timelist 206 of VideoTexture node 205 and the time events listed in script node 210. In one embodiment, the present invention provides an authoring tool that is tailored to facilitate the authoring and editing of VRML scene description file 200, especially with respect to timelist field 205a of VideoTexture node 205 and events in script node 210.

Figure 3:
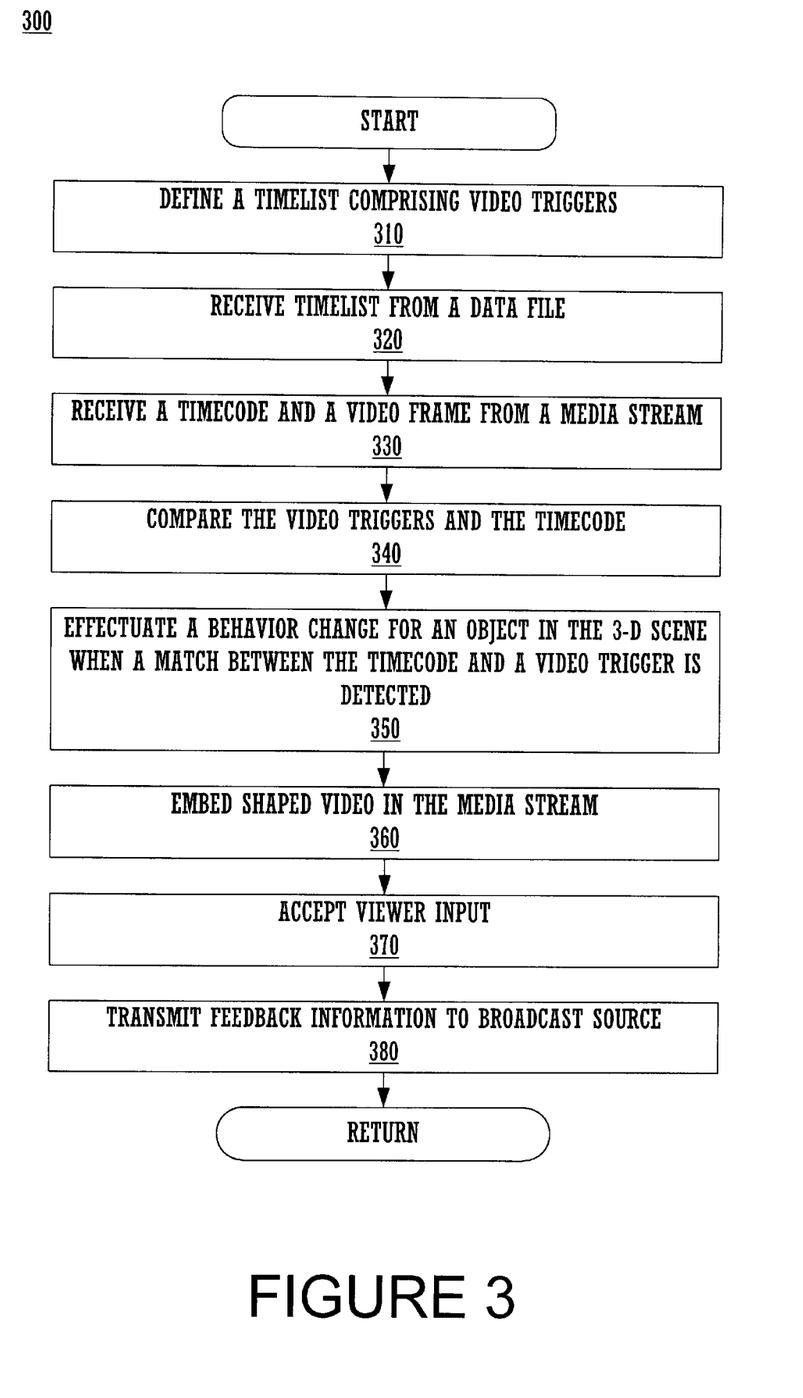
FIG. 3 is a flow diagram illustrating steps for interfacing a three-dimensional (3-D) graphics platform with broadcast video in accordance with one embodiment of the present invention.

Referring next to FIG. 3, a flow diagram illustrating steps for interfacing a three-dimensional (3-D) graphics platform with broadcast video in accordance with one embodiment of the present invention is shown. In step 310, a timelist comprising video triggers is defined. In one embodiment, each of the video triggers represents a time at which an event is to occur within a 3-D graphics scene generated using the 3-D graphics platform of the present invention.

Referring still to FIG. 3, in step 320, the timelist defined in step 310 is received from a data file for processing. In one embodiment, the data file is in an input format supported by the 3-D graphics platform of the present invention. In one embodiment, the timelist comprises timelist 206 of VideoTexture node 205 and the data file comprises VRML scene description file 200, both of which are depicted in FIG. 2.

With reference still to FIG. 3, in step 330, a timecode and a video frame from a media stream of the broadcast video is received for processing, wherein the timecode is characteristic of the video frame. In one embodiment, the timecode comprises timecode 226 of FIG. 2.

Referring again to FIG. 3, in step 340, the video triggers and the timecode are compared. In one embodiment, the comparison is performed using VideoTexture extension 223 of FIG. 2.

With reference again to FIG. 3, in step 350, when a match is detected between one of the video triggers and the timecode, a behavior change for an object in-the 3-D graphics scene is effectuated according to the matched video trigger such that the behavior change is synchronized with the video frame in real-time.

Referring still to FIG. 3, in step 360, shaped video is embedded in the media stream, wherein the shaped video is partially transparent such that special effects can be generated within the 3-D graphics scene.

Referring again to FIG. 3, in step 370, input from a viewer is accepted. In one embodiment, contents of the broadcast video are capable of changing in response to the input. In another embodiment, the input can effectuate behavior change(s) for object(s) of the 3-D graphics scene.

With reference again to FIG. 3, in step 380, feedback information is transmitted to the source of the broadcast video such that the source can modify contents of the broadcast video accordingly. In one embodiment, the feedback information includes the viewer input described above in step 370. A method for interfacing a three-dimensional (3-D) graphics platform with broadcast video in accordance with embodiments of the present invention is thus described.

Figure 4:
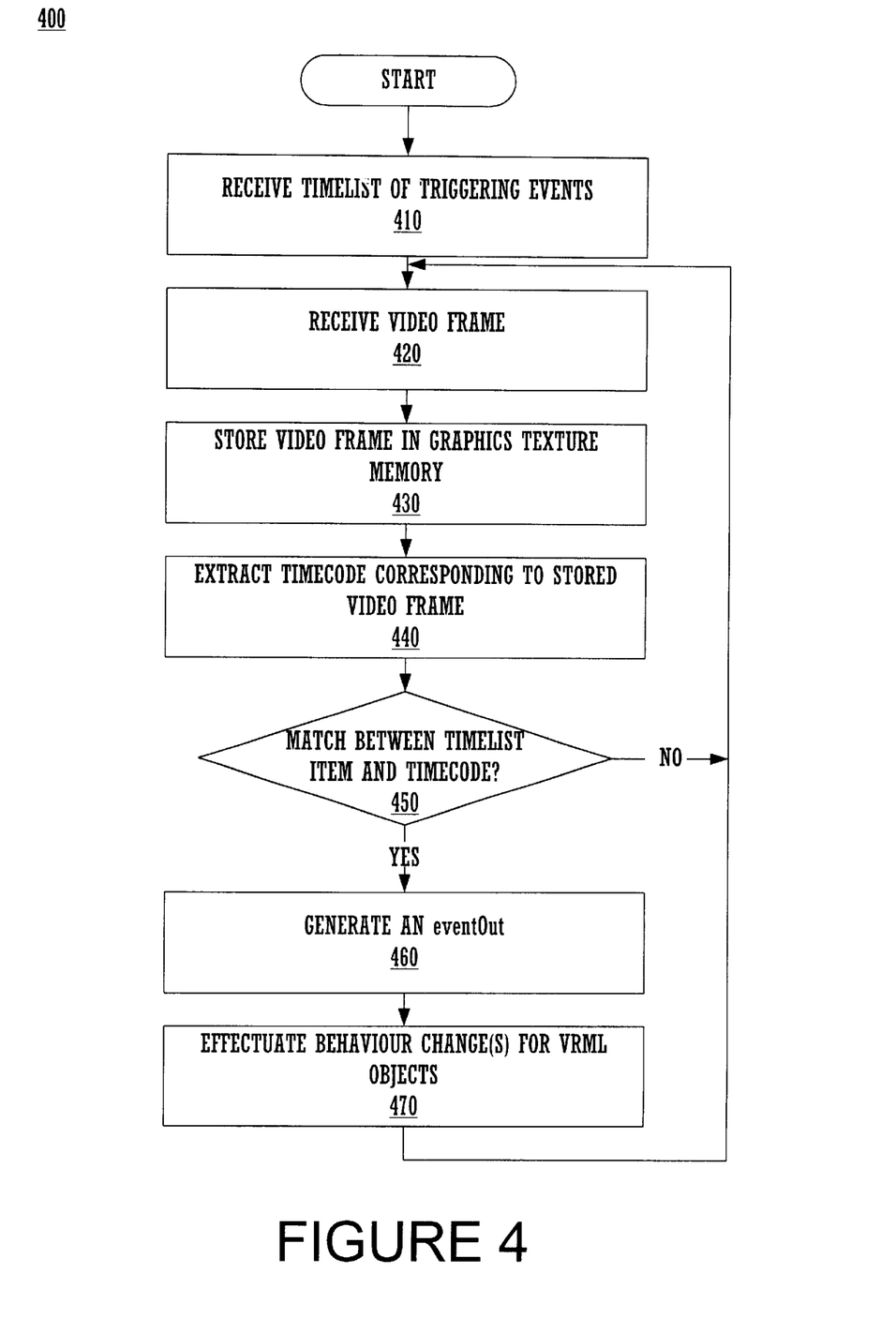
FIG. 4 is a flow diagram illustrating steps for implementing event triggering with a VRML browser in accordance with one embodiment of the present invention.

Referring next to FIG. 4, a flow diagram illustrating steps for implementing event triggering with a VRML browser in accordance with one embodiment of the present invention is shown. In step 410, a list of times at which triggering events are expected to occur is received by the VRML browser of the present invention. In one embodiment, with reference back to FIG. 2, timelist 206 of VideoTexture node 205 in VRML scene description file 200 is received by VideoTexture extension 223 of VRML browser 220. Moreover, in one embodiment, timelist 206 comprises a list of quadruples, wherein each quadruple (h, m, s, f) represents a timestamp at which an event is expected to occur, and wherein h stands for hour, m for minute, s for second, and f for frame.

Referring still to FIG. 4, in step 420, a video frame is received from a video sub-system. In one embodiment, the video sub-system comprises video source 240 of FIG. 2, which can provide video signals from a VTR or a live video feed as described above.

With reference still to FIG. 4, in step 430, the received video frame is stored in a graphics texture memory. In one embodiment, the video frame is stored within texture memory (e.g., volatile memory 106 of FIG. 1A). It is appreciated that once a video frame is stored in texture memory, the frame can be used as a texture as if it was a graphics image. As described above, in one embodiment, two texture buffers are used to enable double-buffering. In this embodiment, when a video frame is being captured into one of the texture buffers, the other texture buffer can be used for drawing (e.g., rendering). Such dual-texture-buffer embodiment of the present invention thus enables real-time video texturing.

Referring again to FIG. 4, in step 440, a timecode corresponding to the stored video frame is extracted from the video sub-system. In one embodiment, the timecode is extracted via a serial port during each frame rendering cycle. More specifically, in one embodiment, referring back to FIG. 2, time poller 224 extracts timecode 226 from video source 240 and sends the extracted timecode 226 over to VideoTexture extension 223.

With reference again to FIG. 4, in step 450, it is determined whether or not there is a match between an item in the timelist and the extracted timecode. In one embodiment, VideoTexture extension 223 compares the data in timelist 206 against the current timecode 226. If a match is detected, process 400 proceeds to step 460; otherwise, process 400 returns to step 420.

With reference still to FIG. 4, in step 460, an eventOut is generated. In one embodiment, referring back to FIG. 2, the corresponding time event of VideoTexture node 205 is returned via the eventOut named timeEvent and sent to script node 210 for further processing.

Referring again to FIG. 4, in step 470, the appropriate changes in behavior for VRML objects in the scene as designated by the triggering time event are effectuated. In one embodiment, with reference back to FIG. 2, script node 210 serves to launch one or more routes (e.g., routes 215) within the VRML scene to trigger the designated behavior changes of VRML objects. Upon the completion of step 470, process 400 returns to step 420. As thus described, event triggering in a VRML scene is implemented by using the VRML extensions (e.g., VideoTexture node 205 and VideoTexture extension 223) of the present invention.

Support for 3-D Content Authoring in Accordance with the Present Invention

The present invention also provides a mechanism which facilitates the authoring of 3-D graphics content where events are triggered by a broadcast signal using a standard VRML authoring tool. More specifically, within the scope of the present invention, a content creator can develop and test 3-D content by utilizing a built-in event generation feature in VRML to simulate broadcast triggers. Once the development and testing has been completed, the content creator can then make simple modifications to the content based on the event flow such that live broadcast triggers can be processed when dynamic content is broadcast.

Figure 5:
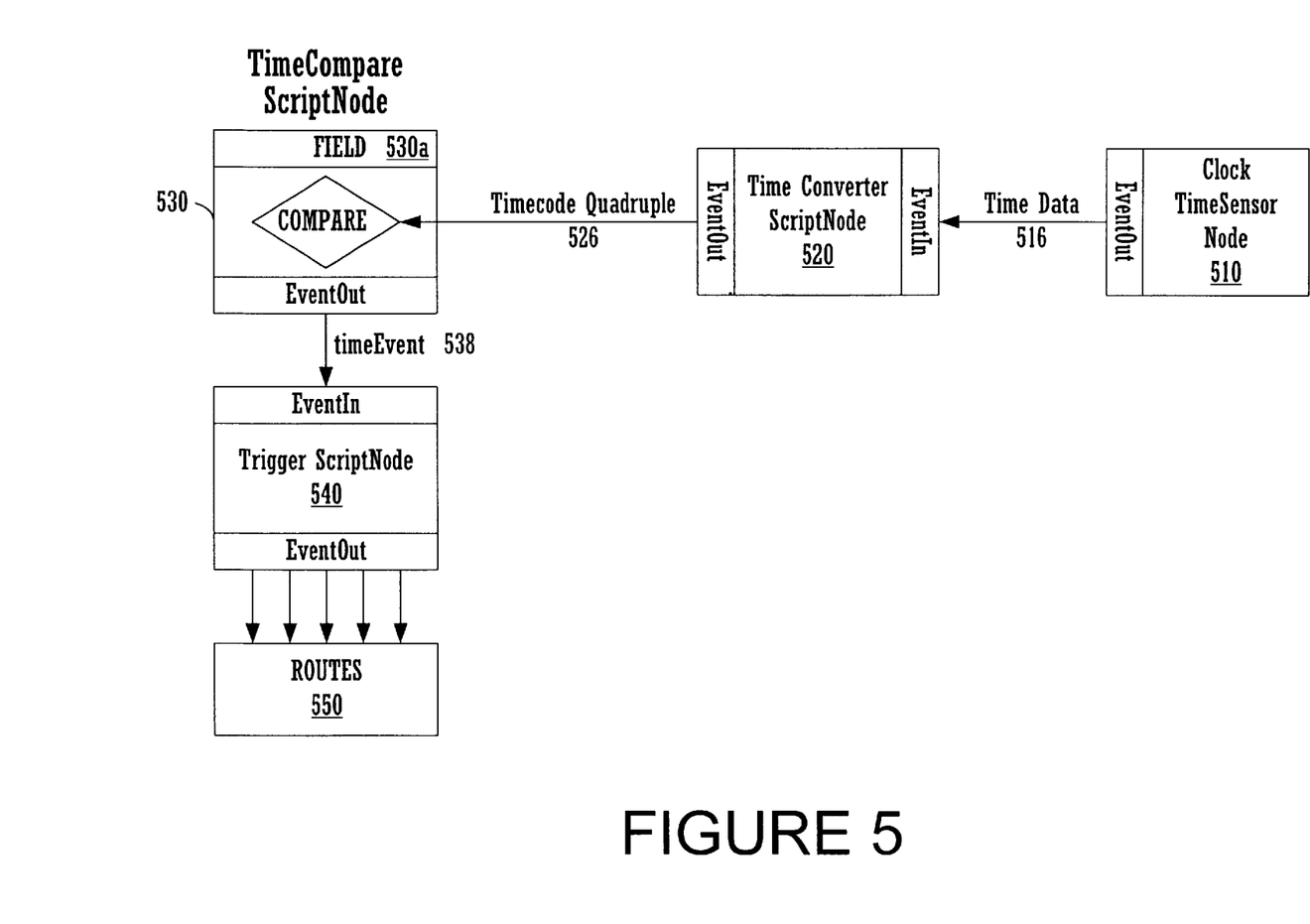
FIG. 5 is a data flow diagram illustrating data flow for simulating event triggering in accordance with one embodiment of the present invention.

With reference next to FIG. 5, a data flow diagram illustrating data flow for simulating event triggering in accordance with one embodiment of the present invention is shown. As illustrated in FIG. 5, in a currently preferred embodiment, data is authored by a content creator and stored in a VRML scene description file having a TimeCompare script node 530 of the present invention, a Trigger script node 540 as well as routes 550. Script nodes and routes are elements of VRML and are known to those of ordinary skill in the art. In one embodiment, a timelist of triggers is stored in the timelist field 530a of TimeCompare script node 530.

Referring still to FIG. 5, a Clock TimeSensor node 510 is used to generate simulation ticks on a periodic basis. In one embodiment, Clock TimeSensor node 510 includes a time eventOut for sending the corresponding time data 516 to a TimeConverter script node 520 upon each simulation tick. In one embodiment, TimeConverter script node 520 converts time data 516 that is the absolute time expressed in the VRML data type SFTime to a traditional timecode quadruple 526, which is then sent to TimeCompare script node 530.

Within the scope of the present invention, TimeCompare script node 530 compares the content in timelist field 530a against timecode quadruple 526. When a match between a specified timestamp in the timelist and timecode quadruple 526 is detected, corresponding time event 538 is sent to Trigger script node 540 for further processing. In one embodiment, Trigger script node 540 serves to launch one or more routes (e.g., routes 550) within the VRML scene when time event 538 is received from TimeCompare script node 530. Routes 550 in turn trigger behavior changes of VRML objects in the scene. It is appreciated that the content author is responsible for ensuring that there exists a one-to-one correspondence between the times listed in timelist field 530a of TimeCompare script node 530 and the time events listed in Trigger script node 540. Significantly, in this embodiment, the present invention allows a standard VRML authoring tool to be used for the authoring and editing of a VRML scene that can dynamically respond to broadcast triggers.

Figure 6:
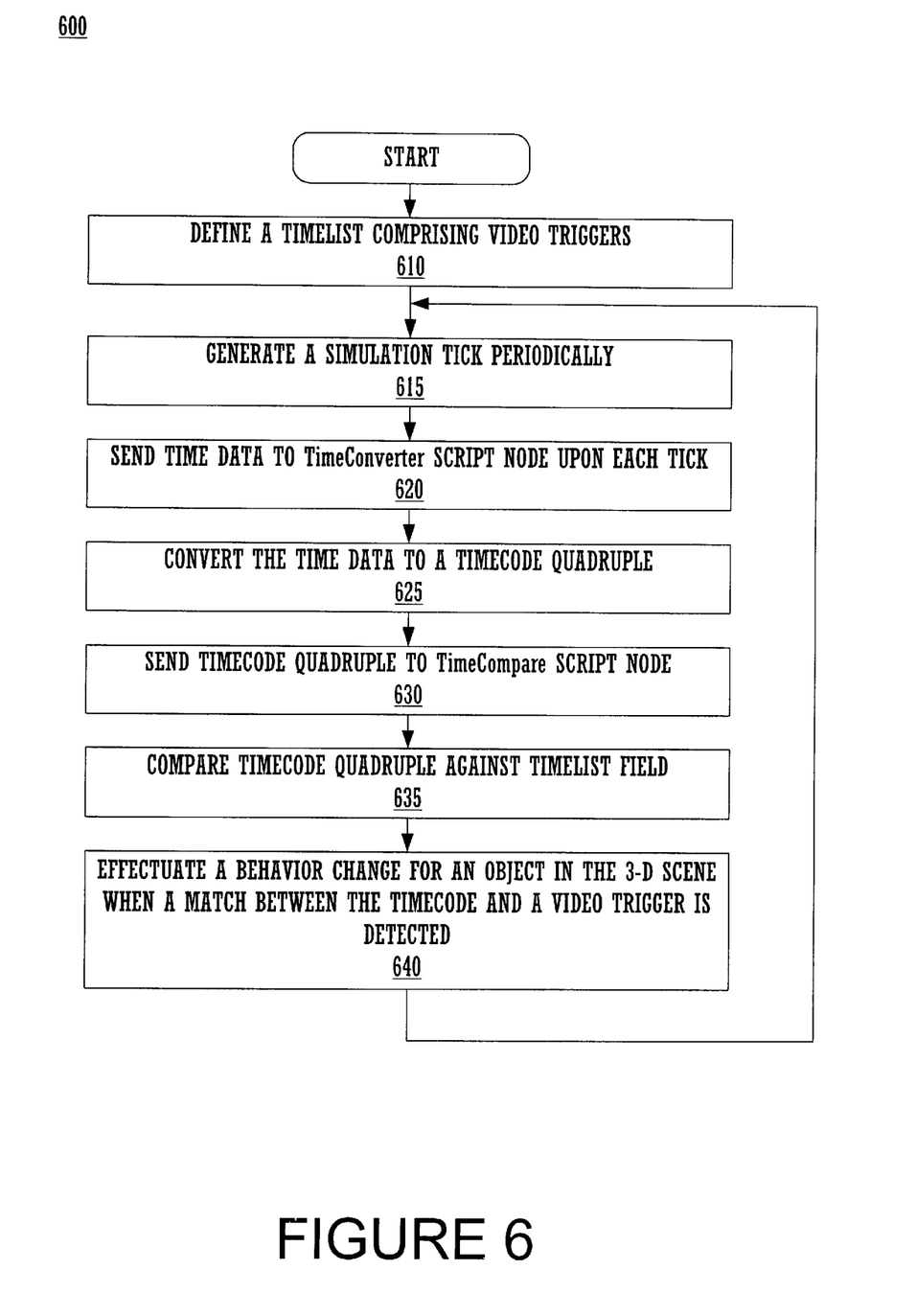
FIG. 6 is a flow diagram illustrating steps for testing event triggering using simulated timecodes in accordance with one embodiment of the present invention.

With reference next to FIG. 6, a flow diagram illustrating steps for testing event triggering using simulated timecodes in accordance with one embodiment of the present invention is shown. In step 610, a timelist comprising video triggers is defined. In one embodiment, each of the video triggers represents a time at which an event is to occur within a VRML scene generated using the VRML platform of the present invention. In one embodiment, the timelist is stored in timelist field 530a of TimeCompare script node 530 of a VRML scene description file as depicted in FIG. 5.

With reference still to FIG. 6, in step 615, a simulation tick is generated periodically as time elapses. In one embodiment, a Clock TimeSensor node generates the simulation tick. Moreover, in one embodiment, consecutive simulation ticks approximate real clock time.

Referring still to FIG. 6, in step 620, time data is sent from the Clock TimeSensor node to a TimeConverter script node whenever a simulation tick is generated. In one embodiment, the time data comprises the absolute time and is represented as VRML data type SFTime.

With reference still to FIG. 6, in step 625, the time data received by the TimeConverter script node is converted to a traditional timecode quadruple. In one embodiment, the timecode quadruple is represented as (h, m, s, f) wherein h stands for hour, m for minute, s for second, and f for frame.

Referring again to FIG. 6, in step 630, the timecode quadruple is sent from the TimeConverter script node to a TimeCompare script node.

Referring still to FIG. 6, in step 635, the timecode quadruple is compared against the timelist field of the TimeCompare script node. In one embodiment, the Time-Compare script node functions substantially the same as VideoTexture node 205 of FIG. 2 as described above, except that the TimeCompare script node does not perform the task of enabling live video in a VRML scene. In this embodiment, a static image is used in place of a live broadcast video feed.

With reference again to FIG. 6, in step 640, when a match is detected between one of the video triggers in the timelist and the timecode, a behavior change for an object in the 3-D graphics scene is effectuated according to the matched video trigger such that the behavior change is synchronized with the simulated video frame. Upon the completion of step 640, process 600 returns to step 615. In one embodiment, steps 615 through 640 can be repeated as many times as necessary until development of testing of the 3-D content (e.g., as specified in the VRML scene description file including the timelist of triggers) is completed. A method for testing event triggering in a VRML scene using simulated timecodes in accordance with an embodiment of the present invention is thus described.

Significantly, a content creator using the method for testing event triggering of the present invention as described above is able to create, test and edit 3-D graphics content that will dynamically respond to broadcast triggers simply by using a standard VRML authoring tool. Importantly, the content creator does not have to get directly involved with most of the underlying aspects of the present invention. More specifically, the content creator just needs to provide a list of timecodes indicating when event triggers should occur and associate each event trigger with certain defined action in the VRML scene. Given the timecodes and their associated actions as inputs, a standard VRML authoring tool can generate the necessary event structure, such as TimeSensor and script nodes (e.g., Clock TimeSensor node 510, TimeConverter script node 520, TimeCompare script node 530) and routes, for simulating broadcast trigger handling in accordance with the present invention. As such, the present invention provides a mechanism which facilitates the authoring of 3-D graphics content where events are triggered by a broadcast signal using a standard VRML authoring tool.

In one embodiment, the Clock TimeSensor node, the TimeConverter script node and the TimeCompare script node are collectively replaced by a VideoTexture node of the present invention, wherein the content of the timelist field of the VideoTexture script node is the same as the content of the TimeCompare script node as of the completion of content development. By so doing, live broadcast triggers can be used in place of the simulated triggers to achieve the same desired events in the VRML scene.

Dynamic Video Effects in Accordance with the Present Invention

With reference back to FIG. 2, within the scope of the present invention, rendering and compositing are performed in real-time in STBs 151, 152 and 153 at the viewers'end, rather than during post-production prior to broadcast at the broadcaster's end. Significantly, by postponing the rendering and compositing phase until the program content reaches the viewer's end, broadcast programming can be highly personalized to cater to each individual viewer's desires. In particular, such late compositing enables the broadcaster to inject-dynamic video effects into the integrated video and graphics scene.

In one embodiment of the present invention, an Ethernet is used as a delivery medium to inject real-time effects into the scene via special effects media streams. In this embodiment, a streamer head end capable of sending out a sequence of uncompressed RGBA images over the Ethernet is used as the video source. It is appreciated that the transmission data rate is dependent upon the frame size as well as the desired frame rate. In this regard, one embodiment of the present invention requires deterministic playback to guarantee a certain frame rate. It is further appreciated that the maximum IP packet size is a constraint to achieving the full frame rate of 30 Hz. As such, in one embodiment, a 32-frame sequence of 256×256 images is streamed over the Ethernet at a rate of 15 Hz. In this embodiment, each video frame is partitioned into multiple packets of smaller size for delivery. Upon receipt at the viewer's end (e.g., STBs 151, 152 and/or 153), the packets are reassembled into their respective frames.

In addition, within the scope of the present invention, compression technologies, such as those developed by the MPEG community, can be applied to embodiments of the present invention to improve the performance of streaming media delivery. Furthermore, other streaming technologies, such as the Synchronized Multimedia Integration Language (SMIL™) that has been recommended by the World Wide Web Consortium (W3C) for synchronizing multimedia streams, can also be used to implement dynamic video effects with in the scope and spirit of the present invention.

Incorporating Multi-user Technology into the Present Invention

Within the scope of the present invention, blending shared 3-D virtual environments with TV broadcasting is enabled by multi-user technologies. In one embodiment, the Community Place architecture developed by Sonny Corporation is the designated multi-user technology. In another embodiment, the emerging Core Living Worlds standard that is being developed for multi-user support in VRML can be used. It is appreciated that these and other multi-user technologies and/or protocols can be utilized to complete the loop of interaction between the viewer(s) and the broadcaster within the scope of the present invention wherein the control and authoring of content is shared. In one commercial version of a Community Place multi-user server (e.g., VES 180 of FIG. 1B) based on a centralized client-server architecture, up to approximately 1000 simultaneous users can be supported. It is appreciated that a distributed Community Place multi-user server can be used within the scope of the present invention to provide scalability for supporting massive multi-user applications. More specifically, in one embodiment, the distributed Community Place architecture comprises multiple servers (e.g., a plurality of VES 180 in the context of FIG. 1B) working in conjunction with a consistency module that ensures global consistency within the virtual world supported by the various servers.

Moreover, within the present invention, the inherent high bandwidth of the DTV broadcast channel can be utilized as an additional path for sending information from the servers to the clients to further enhance scalability. In one embodiment, the virtual world supported by the servers has two levels of information updates. The first level of information updates involves "piggy-backing" of updates over a high data rate DTV broadcast channel and is limited to sending global updates of the virtual world. The second level of information updates uses a different communication link, such as the Internet, to transmit local updates to a subset of viewers. In addition, rendering tasks within the virtual world can be partitioned into upstream and downstream components, which, in one embodiment, are performed at the head end and the viewer's end, respectively. For example, in a multi-player game or game show, elements of the background are rendered at the head end (e.g., by the server; by the broadcaster prior to broadcasting) and then broadcast to clients as an environment map. Client-specific elements are rendered at the viewers'end. As such, use of the available bandwidth can be optimized. In another embodiment, the DTV broadcast channel is used for both the "piggy-backing" of updates and shared rendering described above. In yet another embodiment, load balancing and distribution among multiple servers is used to further optimize performance.

Interactive Music Video in Accordance with the Present Invention

One currently preferred embodiment of the present invention combines the broadcast stream by which traditional music video content is delivered with a 3-D graphics environment that gives the viewer an additional dimension of control and interaction with the video content. In this embodiment, the setting of a "virtual concert hall" is used. Importantly, in accordance with the present invention, the viewer is able to freely navigate in the 3-D environment and interact with objects in the scene representing the virtual concert hall. In one embodiment, the stage of the virtual concert hall features an animated 3-D model of a band, behind which is a screen showing a video feed of the band's recorded performance. In one embodiment, the motion of the 3-D band model is based on the live performance.

Moreover, with reference back to FIG. 2, in one embodiment, using timecode 226 from video source 240, the music video of the instant embodiment can trigger events in the 3-D graphics scene. In an exemplary embodiment, triggers can be set up such that during the course of the music video, whenever the band sings a particular phrase of a song (e.g., reprise or chorus) the graphical spotlights in the 3-D scene will strobe. Triggers can also be set to effectuate changes in camera viewpoint as well as opening and/or closing of the stage curtain. In one embodiment, triggers are set to cause the curtain to open and the band to begin playing at a designated animation start time, and to cause the curtain to close and the band to end its performance at a designated animation stop time. In addition, triggers can be set to activate and deactivate the strobing of the spotlights during the performance.

In a currently preferred embodiment, event triggering is also used to provide synchronization between multiple media streams, such as a video stream and an animation stream. In particular, if the viewer pauses the video, the animation is automatically paused as well. When the video resumes playing,-the animation promptly continues from the point where it left off. Moreover, in this embodiment, such event triggering is implemented according to the process described above with reference to FIGS. 2 and 3.

Furthermore, in one embodiment of the present invention, when the viewer selects a passive viewing mode, the camera triggering events are processed as they are received from the video source and the camera automatically moves to the broadcaster's recommended view according to the triggers as the music video plays. Additionally, in one embodiment, special effect signals (e.g., special effect media streams) are transmitted to provide shaped video footage (e.g., falling leaves, snow) as described above. More particularly, in one embodiment, an effect layer is superimposed across the stage in a zigzag fashion to provide a sense of depth. Since these effects are partially transparent as described previously with respect to shaped video, such an effect layer seamlessly integrates with the rest of the scene. Moreover, the broadcaster has the freedom and flexibility to change the effects at any time.

In another embodiment, shaped video is used to introduce characters as video in a "virtual set" (e.g., video footage of narrators being inserted into a 3-D scene) that is controlled by the viewer. It is appreciated that while virtual set technology has been used as a production technique, it has not been exploited downstream in the device where viewers view the contents (e.g., STBs 151, 152 and 153 of FIG. 1B). As consumers become increasingly accustomed to navigating and manipulating 3-D user interfaces, such as those presented by existing game consoles like the Sonny PlayStation™, the interactive control of virtual sets of the present invention as described above will become an intuitive mechanism for viewers to interact with broadcast content, thereby providing a variety of media experiences that are not available in tradition TV viewing.

Thus, shared control of the overall media experience between the broadcaster and the viewer is made possible by the present invention. For instance, the broadcaster can present imagery to viewers over the broadcast channel and each viewer can selectively view, control or manage the imagery as if it was local content in a 3-D graphics environment. In particular, such possibilities add a profound new dimension to music videos since viewers can manipulate 3-D content to create their own custom experiences. Moreover, by exploiting the interface between the DTV data channel and the 3-D graphics scene, the broadcaster can simplify the process by which viewers can explore and author a rich set of media events with guaranteed synchronization to the broadcast video content.

Although certain embodiments of the present invention as described herein pertains to interactive music video, it is appreciated that many other advantageous applications are possible within the scope of the present invention. For example, the present invention can be advantageously applied to augment networked multi-player games, such as role-playing and/or strategy games, so that broadcast video can be used to add a live element and enhance fidelity of the games. In another embodiment, the present invention can be advantageously used in inhabited motion pictures, wherein viewers can explore virtual versions of movies with broadcast appearances by celebrities. Furthermore, in yet another embodiment, the present invention can be advantageously used to set up virtual museum exhibitions, wherein video and interactive graphics can be combined to make the television a surrogate museum. Therefore, the present invention enables numerous possibilities in a new broadcast paradigm wherein the broadcaster and the viewer can share control of the media content. It should be clear to a person of ordinary skill in the art, having read the description of embodiments of the present invention herein, that other applications and embodiments not expressly described herein are also possible without departing from the scope of the present invention.

The preferred embodiment of the present invention, a system and method for interfacing 3-D graphics content with broadcast video to generate interactive media content wherein the broadcaster and the viewer can share control of the media content, is thus described. While the present invention has been described in particular embodiments, it should be appreciated that the present invention should not be construed as limited by such embodiments, but rather construed according to the below claims.

What is claimed is:

1. A computer implemented method for authoring and testing three-dimensional (3-D) content based on broadcast triggers using a standard authoring tool of a 3-D graphics platform, said method comprising the steps of:

a) defining a timelist comprising video triggers, each of said video triggers representing a time at which an event is to occur within a 3-D graphics scene generated using said 3-D graphics platform, said timelist being stored in a data file that is an input format supported by said 3-D graphics platform;

b) periodically generating a simulation tick representing a simulated video frame from a simulated media stream;

c) generating time data for said simulation tick, said time data being associated with said simulated video frame;

d) comparing said video triggers and said time data; and e) responsive to a match between one of said video triggers and said time data, effectuating a behavior change for an object in said 3-D graphics scene such that said behavior change is synchronized with said simulated video frame in real-time.

2. The method as recited in claim 1 wherein said 3-D graphics platform comprises a Virtual Reality Modeling Language (VRML) platform and wherein said data file comprises a VRML scene description file.

3. The method as recited in claim 2 wherein said step b) is implemented using a TimeSensor node of said VRML platform.

4. The method as recited in claim 3 wherein said timelist is stored in a first script node of said VRML platform, and wherein said first script node supports event triggering by said simulated media stream.

5. The method as recited in claim 4 wherein said step c) comprises the steps of:

c1) generating said time data for said simulation tick, said time data representing absolute time in a native VRML data type; and c2) converting said time data from said native VRML data type to a timecode quadruple.

6. The method as recited in claim 5 wherein said step c2) of converting said time data is implemented using a second script node of said VRML platform.

7. The method as recited in claim 6 wherein said steps a) through e) are repeated until testing of said 3-D content is completed.

8. The method as recited in claim 7 further comprising the step of replacing said TimeSensor node, said first script node and said second script node with a VideoTexture node when testing of said 3-D content is completed, wherein said VideoTexture node supports event triggering by a live media stream rather than said simulated media stream.

9. A computer system comprising a processor coupled to a bus and a memory unit coupled to said bus, said memory unit having stored therein instructions that when executed implement a method of authoring and testing three-dimensional (3-D) content based on broadcast triggers using a standard authoring tool of a 3-D graphics platform, said method comprising the steps of:

a) defining a timelist comprising video triggers, each of said video triggers representing a time at which an event is to occur within a 3-D graphics scene generated using said 3-D graphics platform, said timelist being stored in a data file that is an input format supported by said 3-D graphics platform;

b) periodically generating a simulation tick representing a simulated video frame from a simulated media stream;

c) generating time data for said simulation tick, said time data being associated with said simulated video frame;

d) comparing said video triggers and said time data; and e) responsive to a match between one of said video triggers and said time data, effectuating a behavior change for an object in said 3-D graphics scene such that said behavior change is synchronized with said simulated video frame in real-time.

10. The computer system as recited in claim 9 wherein said 3-D graphics platform comprises a Virtual Reality Modeling Language (VRML) platform and wherein said data file comprises a VRML scene description file.

11. The computer system as recited in claim 10 wherein said step b) of said method is implemented using a TimeSensor node of said VRML platform.

12. The computer system as recited in claim 11 wherein said timelist is stored in a first script node of said VRML platform, and wherein said first script node supports event triggering by said simulated media stream.

13. The computer system as recited in claim 12 wherein said step c) of said method comprises the steps of:

c1) generating said time data for said simulation tick, said time data representing absolute time in a native VRML data type; and c2) converting said time data from said native VRML data type to a timecode quadruple.

14. The computer system as recited in claim 13 wherein said step c2) of said method is implemented using a second script node of said VRML platform.

15. The computer system as recited in claim 14 wherein said steps a) through e) of said method are repeated until testing of said 3-D content is completed.

16. The computer system as recited in claim 15 wherein said method further comprises the step of replacing said TimeSensor node, said first script node and said second script node with a VideoTexture node when testing of said 3-D content is completed, wherein said VideoTexture node supports event triggering by a live media stream rather than said simulated media stream.

17. A computer system for authoring and testing three-dimensional (3-D) content based on broadcast triggers using a standard authoring tool of a 3-D graphics platform, said computer system comprising:

authoring means for defining a timelist comprising video triggers, each of said video triggers representing a time at which an event is to occur within a 3-D graphics scene generated using said 3-D graphics platform, said timelist being stored in a data file that is an input format supported by said 3-D graphics platform;

clocking means for periodically generating a simulation tick representing a simulated video frame from a simulated media stream;

said clocking means also for generating time data for said simulation tick, said time data being associated with said simulated video frame;

comparing means for comparing said video triggers and said time data; and triggering means for effectuating a behavior change for an object in said 3-D graphics scene in response to a match between one of said video triggers and said time data such that said behavior change is synchronized with said simulated video frame in real-time.

18. The computer system as recited in claim 17 wherein said 3-D graphics platform comprises a Virtual Reality Modeling Language (VRML) platform and wherein said data file comprises a VRML scene description file.

19. The computer system as recited in claim 18 wherein said step b) of said method is implemented using a TimeSensor node of said VRML platform.

20. The computer system as recited in claim 19 wherein said timelist is stored in a first script node of said VRML platform, and wherein said first script node supports event triggering by said simulated media stream.

21. The computer system as recited in claim 20 wherein said step c) of said method comprises the steps of:

c1) generating said time data for said simulation tick, said time data representing absolute time in a native VRML data type; and c2) converting said time data from said native VRML data type to a timecode quadruple.

22. The computer system as recited in claim 21 wherein said step c2) of said method is implemented using a second script node of said VRML platform.

23. The computer system as recited in claim 22 wherein said steps a) through e) of said method are repeated until testing of said 3-D content is completed.

24. The computer system as recited in claim 23 wherein said method further comprises the step of replacing said TimeSensor node, said first script node and said second script node with a VideoTexture node when testing of said 3-D content is completed, wherein said VideoTexture node supports event triggering by a live media stream rather than said simulated media stream.

* * * * *